US007114765B2

(12) United States Patent
Ishikawa et al.

(10) Patent No.: US 7,114,765 B2
(45) Date of Patent: Oct. 3, 2006

(54) AUTOMOBILE HOOD

(75) Inventors: Ryoichi Ishikawa, Wako (JP);
Katsuhiro Shibata, Wako (JP);
Kiyotaka Toma, Wako (JP); Masashi Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/166,181

(22) Filed: Jun. 27, 2005

(65) Prior Publication Data
US 2006/0006698 A1    Jan. 12, 2006

(30) Foreign Application Priority Data
Jul. 9, 2004    (JP) .............................. 2004-203324

(51) Int. Cl.
B62D 25/10    (2006.01)
(52) U.S. Cl. ........................... 296/193.11; 296/187.02; 296/187.04; 296/187.09; 180/274
(58) Field of Classification Search .......... 296/187.02, 296/187.09, 187.03, 193.11; 180/274
See application file for complete search history.

(56) References Cited
U.S. PATENT DOCUMENTS
6,090,232 A * 7/2000 Seeliger et al. ............... 156/79

| | | | |
|---|---|---|---|
| 6,135,542 A * | 10/2000 | Emmelmann et al. ...... 296/205 |
| 6,419,305 B1 * | 7/2002 | Larsen .................. 296/203.03 |
| 6,883,627 B1 * | 4/2005 | Staines et al. ............. 180/69.2 |
| 2003/0005793 A1 * | 1/2003 | Dobesberger et al. ......... 75/415 |
| 2003/0072900 A1 * | 4/2003 | Niikura et al. ............. 428/34.1 |
| 2003/0184121 A1 * | 10/2003 | Czaplicki et al. ....... 296/187.02 |
| 2005/0035628 A1 * | 2/2005 | Behr et al. ............. 296/187.02 |

FOREIGN PATENT DOCUMENTS

| DE | 29 34 430 C2 | 3/1981 |
|---|---|---|
| DE | 198 09 750 A1 | 9/1999 |
| DE | 198 46 192 A1 | 4/2000 |
| DE | 199 02 311 A1 | 7/2000 |
| DE | 100 03 623 A1 | 8/2001 |
| DE | 101 26 457 C2 | 12/2002 |
| DE | 102 05 626 A1 | 8/2003 |
| DE | 102 58 299 A1 | 6/2004 |
| JP | 2003-191865 A | 7/2003 |
| JP | 2003-285768 A | 10/2003 |

* cited by examiner

Primary Examiner—Joseph D. Pape
(74) Attorney, Agent, or Firm—Arent Fox PLLC

(57) ABSTRACT

An automobile hood has a skin and a frame reinforcing it. At least part of a space defined between the skin and the frame is packed with a foamed metal which breaks down continuously upon receiving an external force. Its continuous breakdown absorbs a substantially equal amount of impact energy continuously.

17 Claims, 5 Drawing Sheets (COMP. EX.)

(EX.)

AUTOMOBILE HOOD

FIELD OF THE INVENTION

The present invention relates to an automobile hood with increased pedestrian protection capability.

BACKGROUND OF THE INVENTION

When an automobile collides with a pedestrian, it is very likely that the automobile may knock him off and cause his head to be struck against its hood. If the hood is deformed downwardly, it absorbs the energy of the collision effectively and thereby protecting the pedestrian.

It is often the case, however, that a reduction in size of an automobile or any requirement made thereof from a design standpoint makes it necessary to have its engine located immediately below its hood in close proximity thereto. As a result, the hood has only a small room for deflection. Various proposals have, therefore, been made to cope with the situation. A couple of examples are described in JP-A-2003-285768 and JP-A-2003-191865, respectively.

JP-A-2003-285768 discloses an automobile hood 100 as shown in FIG. 7 hereof. The hood 100 is composed of a hood skin 101, a hood frame 102 attached to the underside of the hood skin 101, a plurality of flanges 104 attached along an opening 103 defined by the hood frame 102 and each having a substantially S-shaped cross section and a flange 105 situated in the center of the opening 103 and having a substantially S-shaped cross section.

When an external force acts on the center of the hood skin 101 as shown by an arrow in FIG. 7, the flanges 104 and 105 are deformed as shown by imaginary lines and allow the hood skin 101 to be bent downward as shown by imaginary lines.

FIG. 8 hereof shows the stroke of deformation of the hood 100 in relation to the load acting on it. A study made by the present inventors indicates that as the hood 100 is so constructed that its steel flanges 104 and 105 and its steel hood skin 101 may be plastically deformable, the load acting on it marks a peak in the beginning and drops thereafter with the progress of its buckling. As its absorption of impact energy is proportional to the load acting on it, its performance in absorbing impact energy becomes lower after its peak. Accordingly, it is desirable to explore a structure having an impact energy absorbing performance which does not become lower even after the peak of the load acting on it.

JP-A-2003-191865 discloses an automobile hood as shown in FIG. 9. The hood 110 is shown upside down for convenience of explanation and has a hood skin 111, a hood frame 112 attached to the hood skin 111 and a plurality of conical dimples 113 protruding from the hood frame 112 to the hood skin 111. The dimples 113 are plastically deformable to absorb impact energy.

The dimples 113 are, however, effective only when an external force resulting from the collision of the automobile acts on that part of the hood skin 111 under which one of the dimples is situated, and the hood does not provide any impact energy absorbing performance as desired when the external force acts on the hood skin between any two adjoining dimples 113. Accordingly, it is desirable to explore a structure having the same impact energy absorbing performance whichever part thereof may receive an external force as a result of the collision of the automobile.

SUMMARY OF THE INVENTION

According to this invention, therefore, there is provided a hood for an automobile which has a hood skin, a hood frame attached to the underside of the hood skin for reinforcing the hood skin and a foamed metal filling wholly or partly a space defined between the hood skin and frame.

The foamed metal in the hood of this invention breaks down continuously upon receiving an external force. By breaking down continuously, it absorbs a substantially equal amount of impact energy constantly. The foamed metal can be arranged within the hood in the form of a flat board and absorb impact energy whichever part of the hood having a large surface area may receive an external force. Accordingly, the hood exhibits the same impact energy absorbing performance whichever part thereof may receive an external force as a result of the collision of the automobile, and even after the load has marked its peak.

The foamed metal is preferably of aluminum or an alloy containing aluminum as its principal element. As aluminum is a light metal, the hood has a light weight and thereby contributes to a reduction in weight of the automobile.

The foamed metal preferably has a density of 0.05 to 0.6 $g/cm^3$. A foamed metal having a density of less than 0.05 $g/cm^3$ has too high a void ratio to absorb impact energy satisfactorily and when it has received a heavy vibration as when the automobile has made a big jump on an uneven road surface, the metal may be seriously pulverized and fail to retain its shape. On the other hand, a foamed metal having a density over 0.6 $g/cm^3$ has too low a void ratio to absorb impact energy satisfactorily. According to this invention, therefore, the foamed metal has a density of 0.05 to 0.6 $g/cm^3$ to retain its shape and its impact energy absorbing performance as well.

The hood frame preferably has a plurality of holes through which to discharge fragments or particles of the foamed metal. If there remain fragments or particles formed by a broken metal, they are likely to restrain the deflection of the hood frame. The discharge of such fragments or particles through those holes makes it possible to ensure the deflection of the hood frame and retain its impact energy absorbing performance.

BRIEF DESCRIPTION OF THE DRAWINGS

Certain preferred embodiments of this invention will now be described with reference to the accompanying drawings, in which.

DETAILED DESCRIPTION OF THE PREFERRED EMBODIMENTS

Figure 1:
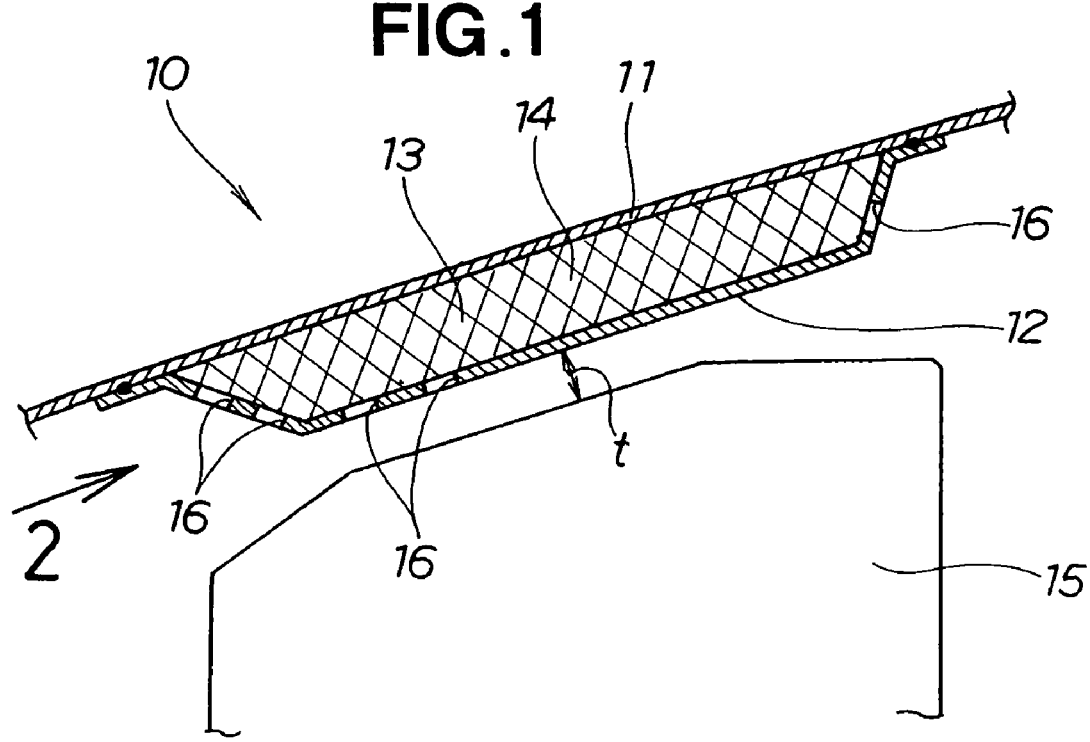
FIG. 1 is a sectional view of an automobile hood embodying this invention.

Referring first to FIG. 1, there is shown an automobile hood 10 having a hood skin 11, a hood frame 12 attached to the underside of the hood skin 11 for reinforcing it and a foamed metal 14 filling wholly or partly a space 13 defined between the hood skin 11 and the hood frame 12.

The foamed metal 14 may be of aluminum, iron, magnesium, zinc or an alloy thereof, but is preferably of aluminum, since it is easily available and has a low specific gravity which is beneficial for a reduction in weight of the hood 10.

The foamed metal 14 may be prepared from, for example, an aluminum powder containing silicon as a metal powder and hydrogenated titanium as a foaming agent. The foaming agent is used in a large amount when it is sufficient for the foamed metal 14 to be low in density, and in a small amount when the contrary is the case. The metal powder and the foaming agent are thoroughly mixed and their mixture is heated to a temperature of 550° C. to 600° C. in a mold. The foaming agent is gasified and the whole expands to give the foamed metal 14 as intended. It is alternatively possible to put the mixture of the metal powder and the foaming agent directly in the hood 10 and heat the hood 10 to foam the metal when filling the whole space in the hood 10 with the foamed metal 14. This method eliminates the necessity of preparing the mold and placing the foamed metal in the hood. Thus, a wide range of options are available for the metal used to prepare the foamed metal 14, the foaming agent to be used and the method of preparing the foamed metal, including the use of the mold.

The reference numeral 15 denotes an engine. The thickness of a clearance t between the hood frame 12 and the engine 15 thereunder can be minimized so long as it can ansure a space for any interference of the hood frame 12 with the engine 15 due to vibration thereof.

Figure 2:
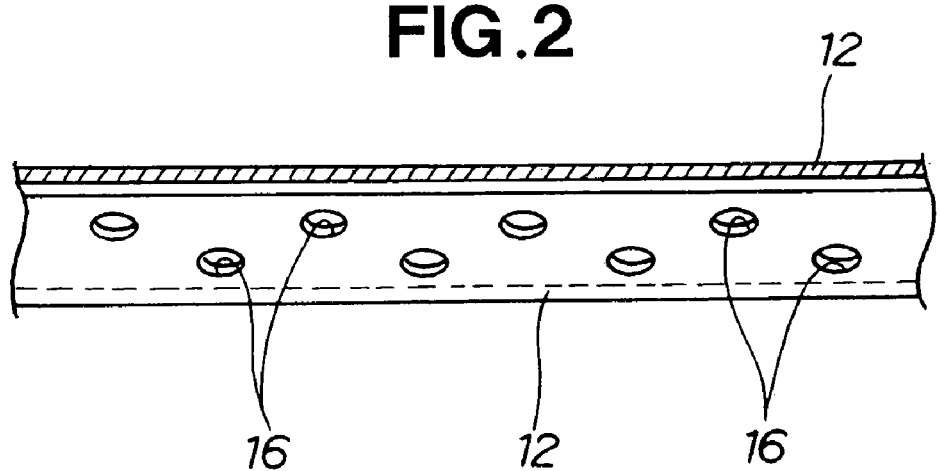
FIG. 2 is a view taken along the arrow 2 in FIG. 1.

The hood frame 12 has a plurality of discharge holes 16 made in some portions thereof as shown in FIG. 2. The holes 16 may alternatively be formed at equal intervals of space throughout the hood frame 12 and the hood frame 12 may be formed from a punched metal plate. When the holes 16 are formed locally, it is desirable for them to be formed mainly in a bottom or lower location where fragments of the foamed metal 14 are more likely to gather, as shown in FIG. 1.

Figure 3:
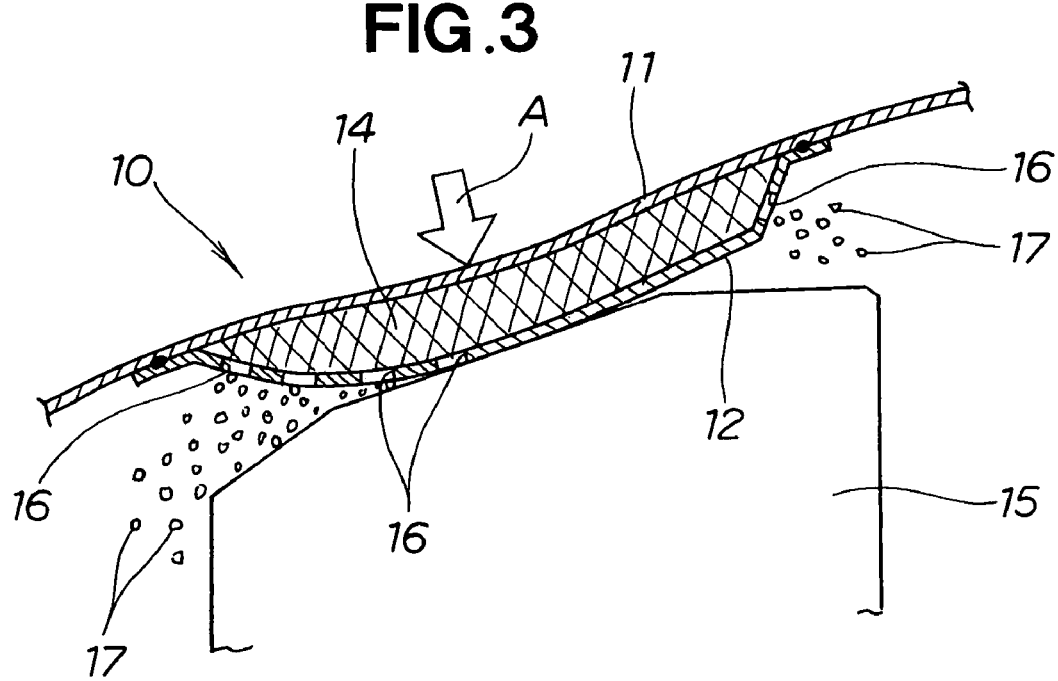
FIG. 3 is a view showing the operation of the hood shown in FIG. 1.

Attention is now directed to FIG. 3 showing the hood 10 as deformed by a load acting on its top. If an external force acts on the hood 10 as shown by an arrow A, the hood 10 is downwardly deflected in its entirety. Until the hood frame 12 strikes against the engine 15, the deformation of the hood skin 11 proceeds, while its deformation shifts from the mode of elastic deformation to that of plastic deformation. In the meantime, the foamed metal 14 undergoes continuous breakdown. The deformation of the hood frame 12 also proceeds, while its deformation shifts from the mode of elastic deformation to that of plastic deformation.

When the hood frame 12 has struck against the engine 15, its deformation stops, but the hood skin 11 continues its plastic deformation and the foamed metal 14 continues its breakdown. As fragments or particles 17 of the foamed metal 14 are formed by its breakdown, it is desirable for them to be discharged through the holes 16 as shown. If they remain in the hood, they are likely to hinder the deflection of the hood skin 11 or exert any other adverse effect on the hood.

The absorption of energy of the external force (impact) is performed mainly by the breakdown of the foamed metal 14, though the plastic deformation of the hood skin 11 and the hood frame 12 also contributes to it. Experiments have been conducted about the absorption of energy as will be described later.

Figure 4:
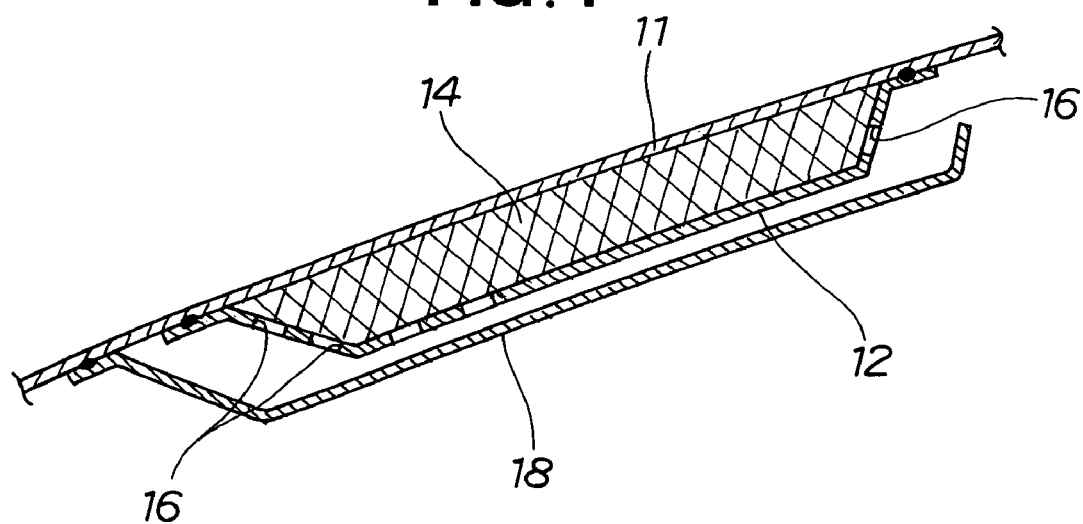
FIG. 4 is a sectional view of a modified form of hood shown in FIG. 1.

The foamed metal 14 basically breaks down upon receiving a certain amount of an external force. Due to the nature of the foamed metal 14, however, fragments or particles are likely to fall from its surface with the passage of a long time even if there may not be any collision. It is important to ensure that no such fragments or particles discharged from the hood do harm to any pedestrian, etc. after leaving the automobile, or stay in the engine room and adversely affect the operation of any auxiliary or engine-related device. Therefore, a modified form of hood is provided as shown in FIG. 4. FIG. 4 shows a hood having a powder receiving member 18 situated below a hood frame 12 and formed from a very thin sheet of a resin or light metal.

Experiments

Figure 5A:
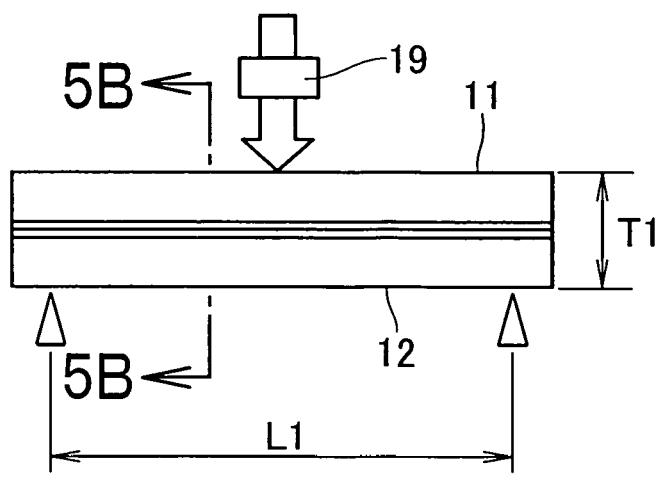
FIGS. 5A to 5D are two sets of views comparing a hood embodying this invention and a comparative hood by experiments.
Figure 5B:
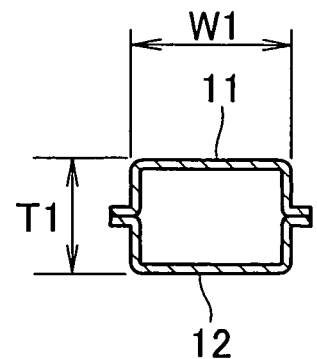
Figure 5C:
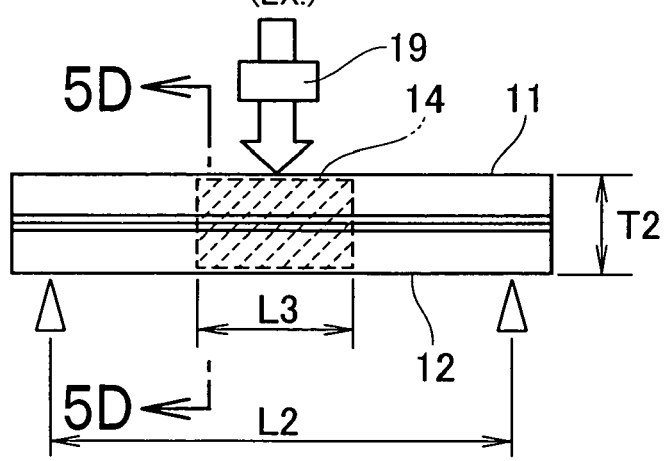
Figure 5D:
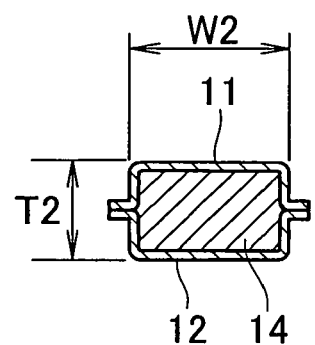

FIGS. 5C and 5D show an automobile hood selected as an experimental example of this invention and not intended to limit its scope, and FIGS. 5A and 5B show an automobile hood as a comparative example. The hood according to the comparative example shown in FIGS. 5A and 5B had a hood skin 11 and a hood frame 12 both formed from a steel sheet having a thickness of 1.6 mm and a mechanical strength in the order of 590 MPa. It was a hollow structure having a height T1 of 32 mm, a width W1 of 50 mm and a distance L1 of 300 mm between two supporting points. An external force was applied to the center of the hood skin 11 by a load cell 19 and the amount (or stroke) of its deflection was measured, while the load acting thereon was detected by the load cell 19. The results are shown in FIG. 6.

The hood according to the example of this invention shown in FIGS. 5C and 5D had a hood skin 11 and a hood frame 12 both formed from a steel sheet having a thickness of 1.6 mm and a mechanical strength in the order of 590 MPa and a foamed metal 14. It had a height T2 of 25 mm, a width W2 of 50 mm and a distance L2 of 300 mm between two supporting points and was packed with the foamed metal 14. The foamed metal 14 was a mass of foamed aluminum having a density of 0.05 to 0.6 g/cm$^3$ and a length L3 of 100 mm. An external force was applied to the center of the hood skin 11 by a load cell 19 and the amount (or stroke) of its deflection was measured, while the load acting thereon was detected by the load cell 19. The results are shown in FIG. 6.

Figure 6:
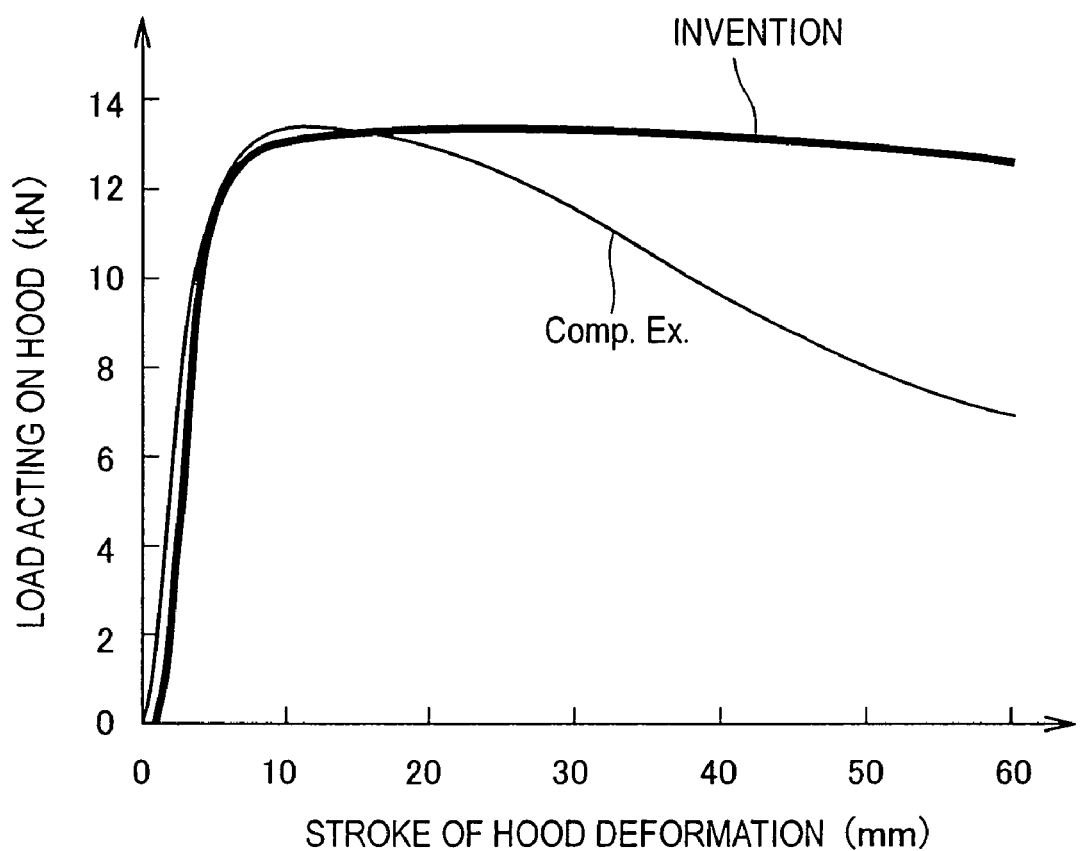
FIG. 6 is a graph comparing the hood embodying this invention and the comparative hood in the stroke of deflection in relation to the load acting thereon.
Figure 7:
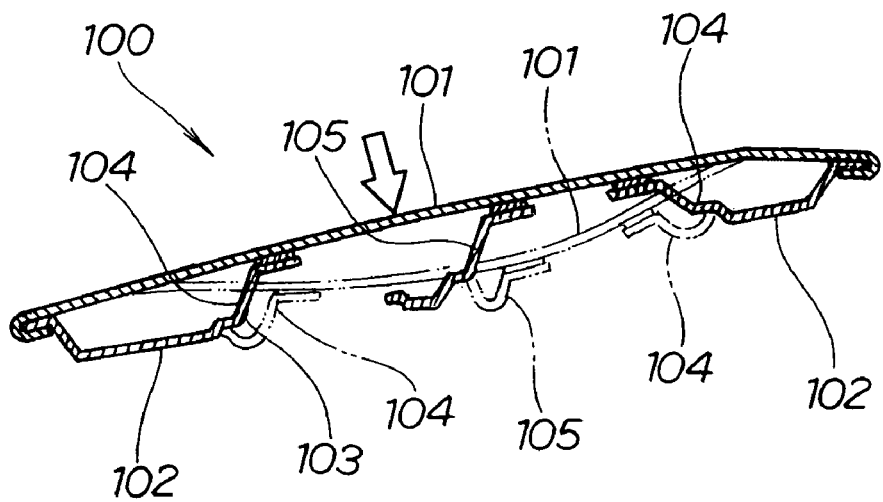
FIG. 7 is a sectional view of a first known automobile hood.
Figure 8:
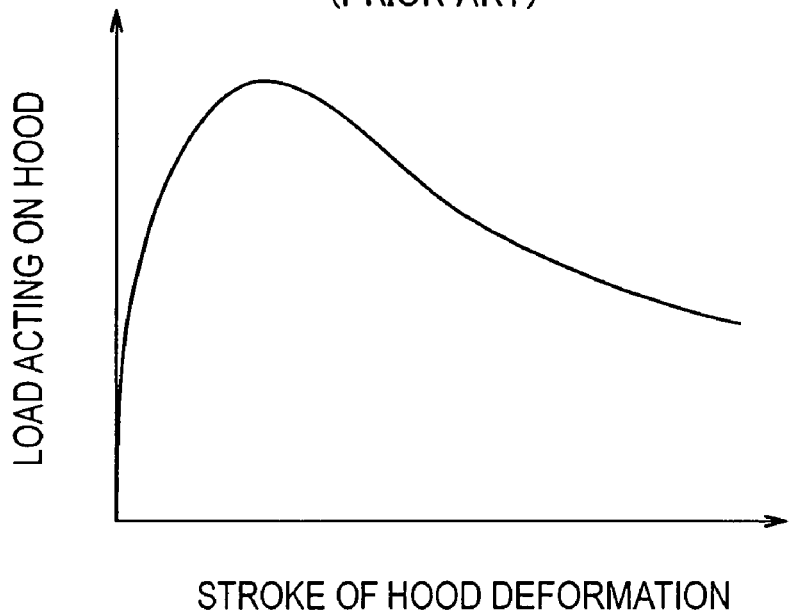
FIG. 8 is a graph showing the relationship between the stroke of deflection of the hood shown in FIG. 7 and the load acting thereon.
Figure 9:
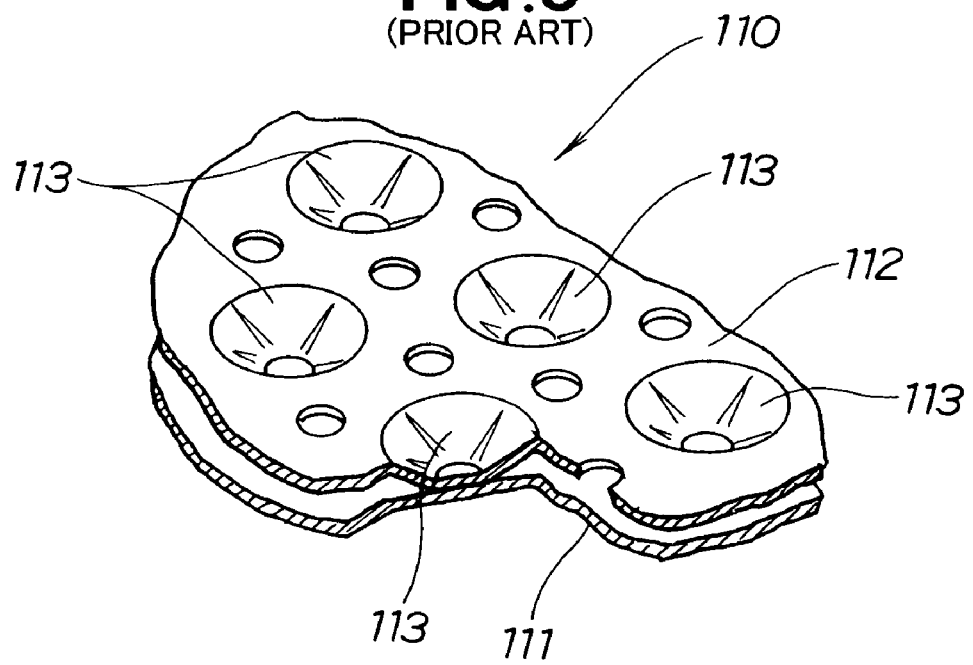
FIG. 9 is a perspective view showing the structure of a second known automobile hood.

FIG. 6 compares the results of the experiments conducted on the comparative hood and the hood embodying this invention in the stroke in relation to the load acting thereon. According to the comparative example, the load marked its peak at a stroke of hood deformation in the vicinity of 10 mm and gradually decreased thereafter. As the absorption of impact energy by the hood is proportional to the load acting thereon, the impact energy absorbing performance of the comparative hood was undesirably low after the peak of the load acting thereon. On the other hand, the hood embodying this invention showed a very high impact energy absorbing performance as the load acting thereon remained substantially equal throughout its stroke of deformation from about 8 mm to over 60 mm. The result differentiating this invention from the comparative example owes itself to the foamed metal. The foamed metal absorbs energy continuously by breaking down continuously and provides a very high energy absorbing performance.

Although this invention may be most advantageously applicable to a passenger automobile having an engine installed immediately below a hood, it is equally applicable to any other type of automobile.

Obviously, various minor changes and modifications of the present invention are possible in the light of the above teaching. It is therefore to be understood that within the scope of the appended claims the invention may be practiced otherwise than as specifically described.

What is claimed is:

1. A hood for an automobile, comprising:
   a hood skin;
   a hood frame attached to an underside of the hood skin for reinforcing the hood skin, wherein the hood frame includes a planar member disposed substantially parallel to the hood skin, the planar member having a first end, a second end opposite the first end, a first leg extending from the first end of the planar member to the hood skin, and a second leg extending from the second end of the planar member to the hood skin;
   a foamed metal filling wholly or partly a space defined between the hood skin and the hood frame; and
   a receiving member attached directly to the underside of the hood skin, wherein the hood frame is completely encased by the receiving member.

2. A hood as set forth in claim 1, wherein the foamed metal comprises a material selected from the group consisting of aluminum and an alloy containing aluminum as its principal element.

3. A hood as set forth in claim 1 or 2, wherein the foamed metal has a density of 0.05 to 0.6 g/cm$^3$.

4. A hood as set forth in claim 1, wherein the hood frame has a plurality of holes through which to discharge fragments or particles of the foamed metal.

5. A hood as set forth in claim 1, wherein the first and second legs of the planar member extend obliquely relative to the hood frame and the hood skin.

6. A hood as set forth in claim 1, wherein the receiving member is formed from one of a resin and a metal.

7. A hood as set forth in claim 1, wherein the hood frame is formed from a punched metal.

8. A hood as set forth in claim 7, wherein the hood frame has a plurality of holes through which to discharge fragments or particles of the foamed metal, wherein the holes are formed at equal intervals in the hood frame.

9. A hood as set forth in claim 7, wherein the hood frame has a plurality of holes through which to discharge fragments or particles of the foamed metal, wherein the holes are formed at unequal intervals in the hood frame.

10. A hood for an automobile, comprising:
    a hood skin;
    a hood frame attached to an underside of the hood skin for reinforcing the hood skin;
    a foamed metal filling wholly or partly a space defined between the hood skin and the hood frame; and
    a receiving member attached directly to the underside of the hood skin, wherein the hood frame is completely encased by the receiving member.

11. A hood as set forth in claim 10, wherein the foamed metal comprises a material selected from the group consisting of aluminum and an alloy containing aluminum as its principal element.

12. A hood as set forth in claim 10, wherein the foamed metal has a density of 0.05 to 0.6 g/cm$^3$.

13. A hood as set forth in claim 10, wherein the hood frame has a plurality of holes through which to discharge fragments or particles of the foamed metal.

14. A hood as set forth in claim 10, wherein the receiving member is formed from one of a resin and a metal.

15. A hood as set forth in claim 10, wherein the hood frame is formed from a punched metal.

16. A hood as set forth in claim 15, wherein the holes are formed at equal intervals in the hood frame.

17. A hood as set forth in claim 15, wherein the holes are formed at unequal intervals in the hood frame.

* * * * *